United States Patent [19]

Lambarelli et al.

[11] Patent Number: 4,663,758
[45] Date of Patent: May 5, 1987

[54] WIDEBAND INTEGRATED SERVICES LOCAL COMMUNICATION SYSTEM

[75] Inventors: Livio Lambarelli, Turin; Daniele Roffinella, Moncalieri; Maurizio Sposini, Valdellatorre, all of Italy

[73] Assignee: Cselt-Centro Studi e Laboratori Telecomunicazioni SpA, Turin, Italy

[21] Appl. No.: 768,861

[22] Filed: Aug. 23, 1985

[30] Foreign Application Priority Data

Aug. 28, 1984 [IT] Italy ............................. 67856 A/84

[51] Int. Cl.$^4$ ............................................... H04J 3/26
[52] U.S. Cl. ........................................ 370/94; 370/85
[58] Field of Search .................... 370/94, 89, 60, 88, 370/85; 340/825.5, 825.51

[56] References Cited

U.S. PATENT DOCUMENTS

| | | | |
|---|---|---|---|
| 4,154,983 | 5/1979 | Pedersen | 370/89 |
| 4,482,999 | 11/1984 | Janson et al. | 370/60 |
| 4,542,499 | 9/1985 | Bella et al. | 370/94 |
| 4,549,291 | 10/1985 | Renoulin et al. | 370/89 |
| 4,569,041 | 2/1986 | Takeuchi et al. | 370/94 |

OTHER PUBLICATIONS

G. Fioretto, L. Gabrielli, N. Lotito, M. Sposini, A Hybrid Switching System with Variable Bit Rate, Feb. 1984, CSELT Rapporti Tecnici vol. XII, No. 1, pp. 63–73.

Primary Examiner—Douglas W. Olms
Attorney, Agent, or Firm—Karl F. Ross; Herbert Dubno

[57] ABSTRACT

The system comprises a plurality of units arranged along a unidirectional line whereupon information is transmitted relevant to circuit switched and packet switched communications and organized into hybrid frames comprising a region for each communication type. The units comprise devices handling the access to the line which cooperate with one another and with a frame signal generator, centralized or associated with each unit, to implement in distributed way an ordered protocol without collisions in both frame region, based on physical unit location.

11 Claims, 18 Drawing Figures

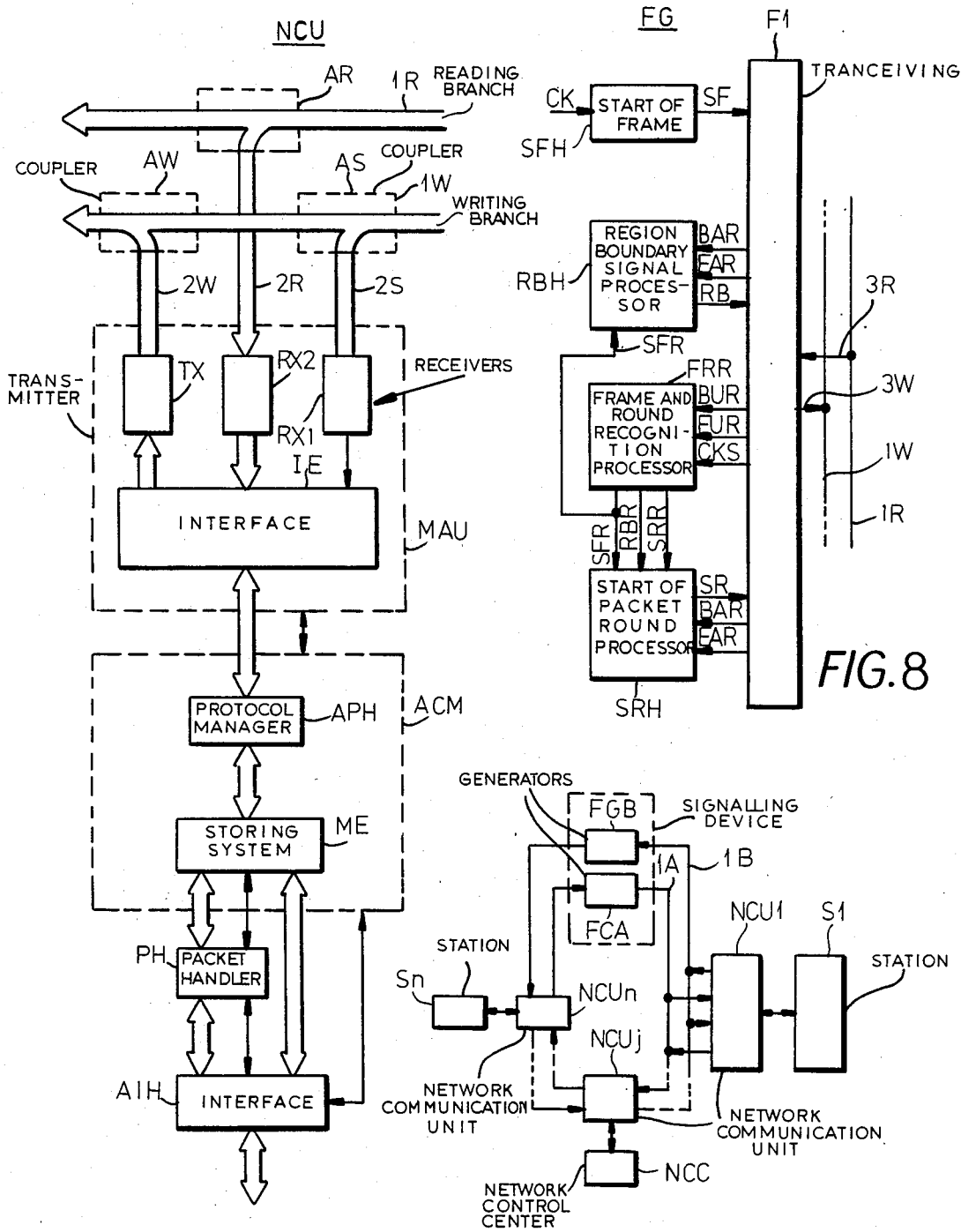

WIDEBAND INTEGRATED SERVICES LOCAL COMMUNICATION SYSTEM

FIELD OF THE INVENTION

The present invention concerns integrated services telecommunications networks and more particularly a local-area wideband integrated services communication system.

The term "local" means that the system is to interconnect users distributed over distances varying from some hundred meters to some ten kilometers.

BACKGROUND OF THE INVENTION

Local area networks were originally intended to interconnect the computing resources in a firm (local computer networks) and they have afterwords been adapted to allow voice transmission in addition to data transmission.

Nowadays local area networks are rapidly evolving as there is a trend towards an integration of all communications services in a firm into a single network.

The resulting network must accomodate not only conventional voice and data services, but also new services such as high resolution graphics services for CAD (computer-aided design) or CAM (computer aided manufacturing) applications, video conferencing, remote control of manufacturing, high resolution video broadcasting.

Local networks ought to have very high capacity of the order of some hundreds Mbit/s or even of the Gbit/s to be able to handle the traffic originated by a very high number of sources (some thousands); besides, source requirements may be very different as to:

- transmission rate (and consequently band occupation) which may range from some kbit/s (speech services) to several Mbit/s (graphic or video services) and may be variable for a given service;
- maximum acceptable delay ranging from few ms (services requiring real-time information processing, such as graphics facilities or remote control of manufacturing) to some hours (e.g. data files transfer, electronic mail, etc.);
- error rate;
- amount of traffic originated by the individual sources;
- switching modalities: circuit switching for communications with continuity and/or synchronism characteristics or packet switchig for the other communications.

As telecommunications, and more particularly office automation are growing quickly, a local communication system ought to adapt itself easily to variations in the offered facilities, and to grow as the user requirements increase. Besides, these systems are generally private systems and their connections to the future integrated services public network ought to be simple and cost-effective.

Integrated services networks are known in which processing requirements of information originated by very different sources are met by organizing the network activity into repetitive frames, composed of two regions assigned to circuit-switched communications (basically time division multiplexed, so that each is allotted a time interval or channel of duration proportional to the transmission rate) and to packet switched communications respectively. These frames are generally referred to as hybrid frames.

An example is described in Italian Patent Application No. 67736-A/82 filed on 9th June 1982, in the name of the Applicant, which discloses a distributed variable-band switching system for speech and data intended for a topology with "islands" with high terminal concentration connected to a unidirectional folded bus. In this system a distributed bus access management is disclosed such that, for data communications the bus capacity is shared among the various islands according to an ordered-access protocol whereas the activity of the terminals inside an island can be controlled by a random-access protocol. For synchronous communications, constant-duration channels are provided which occur periodically for the whole call duration.

The solution described in the above-mentioned Patent Application is mainly studied for conventional low-rate speech /data services and hence cannot be satisfactorily used for the new applications: in effect contention accesses and collision possibility cause very low effciency, taking into account the high transmission rates envisaged. In addition, the known system requires memorization of the activity on the bus on a frame-by-frame basis and therefore it does not allow dynamic management of services whose band requirements vary during the connection (e.g. TASI or DSI systems, variable bit-rate coding) or, in general, dynamic frame management.

An example of a system with dynamic hybrid frame management is described in the paper entitled: "A hybrid switching system with variable bit rate" by G. Fioretto, L. Gabrielli, N. Lotito, M. Sposini, CSELT Rapporti Tecnici, vol. XII, No. 1, February 1984, pages 63–73.

The solution proposed in this paper is satisfactory for a switching node, but cannot be used for a local area network for constructive reasons and owing to frame management modalities. In fact the node comprises a plurality of modules interconnected by a parallel bus, which can be usefully used over short distances (some tens meters), and not over distances of some hundreds meters of kilometers as can be necessary in a local network; in fact for these distances a parallel bus has high installation costs and, taking into account high transmission rates, presents risks of different transmission delays on the different wires. Besides, frame control is completely distributed, i.e. the generation of the "start of frame" and "region boundary" flags is allotted frame by frame to the module processing the first and the last channel of the circuit region, respectively: this entails a considerable efficiency limitation, as, owing to the long distances considered, the propagation delays of such signals and hence the waiting times necessary for a module to recognize whether or not it is entrusted woth the emission become very long. The efficiency is further limited by pauses between adjacent channels which over the above distances have durations equal to or longer than channel durations, and by the possibility of packet collisions. Finally, the dynamic speech circuit management requires sending additional signalling with consequently increased circuitry complexity.

OBJECT OF THE INVENTION

It is, therefore the principal object of the present invention to overcome these disadvantages within a wide-band local network, by a system where an actual services integration is achieved with high efficiency owing to an ordered-access protocol which is based on the source location, which is implemented in distributed manner and which establishes at each instant the source enabled to transmission, and owing to frame signal management, which is at least partly centralized or, if is not centralized, is allotted to a single unit in a frame.

SUMMARY OF THE INVENTION

These objects and others will become apparent hereinafter, in accordance with the present invention, a system comprising a plurality of units arranged along a unidirectional line, whereupon information is transmitted relevant to circuit switched and packet switched communications and organized into hybrid frames comprising a region for each communication type.

The units comprise devices handling the access to the line which cooperate with one another and with a frame signal generator, centralized or associated with each unit, to implement in distributed way an ordered protocol without collisions in both frame regions, based on physical unit locations.

BRIEF DESCRIPTION OF THE DRAWING

An embodiment of the invention will now be described with reference to the accompanying drawings, in which:

FIG. 3 is a block diagram of one of the communication units in the system;

FIG. 4 is another example of system according to the invention in which active components are used;

FIG. 8 is a block diagram of frame signal generator;

In FIGS. 1, 2 and 4 an integrated services local communication system comprises at least one wide-band unidirectional bus 1, advantageously consisting of an optical fiber, along which devices NCU1 ... NCUi ... NCUj ... NCUn, hereinafter referred to as "network communication units", are located. One of these units, e.g. NCUj, is connected to a so-called network control center NCC, carrying out the functions which ought to be centralized (e.g. storage of tariffs, storage of the associations between subscribers and units NCU, etc.). A plurality of stations S1(S1-1 ... S1-h), Si(Si-1 ... Si-k), Sn(Sn-1 ... Sn-m) corresponding to one or more terminals for the different services the network can offer, are connected to the other units NCU. Units NCU are to control in distributed manner the bus access protocol and to organize the information emitted by the sources into constant-duration hybrid frames, i.e. frames subdivided into two regions, one allotted to circuit switched communication and the other to packet switched communications, the information will be transmitted on the bus with a suitable modulation. Access protocol characteristics and frame organization will be described hereinafter.

The bus is further connected to a device FG which generates and sends all the units at least some of the signallings necessary to communication handling, in particular at least a "Start-of-frame" flag SF.

Figure 1:
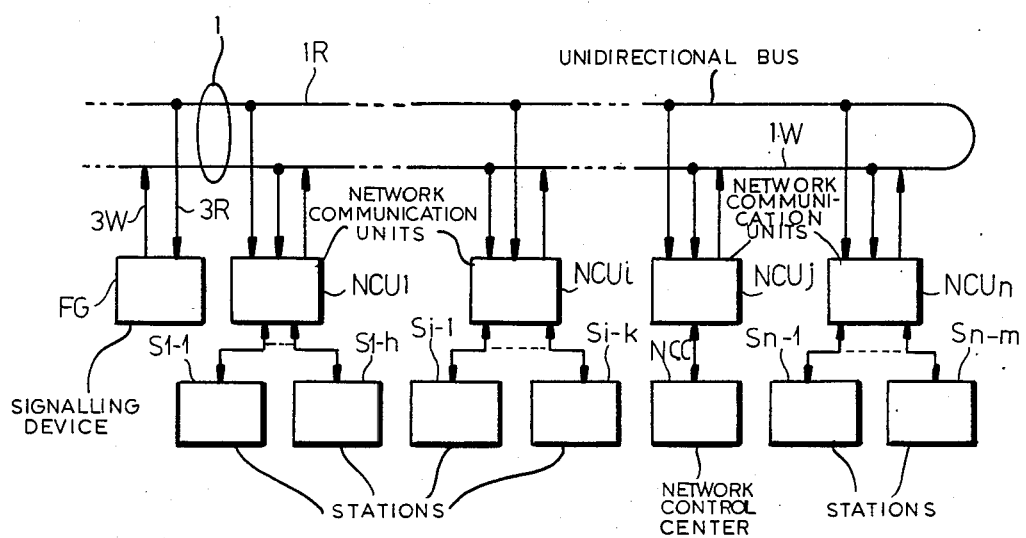
FIGS. 1 and 2 are examples of topologies of communication systems according to the invention in case of use of passive components.
Figure 2:
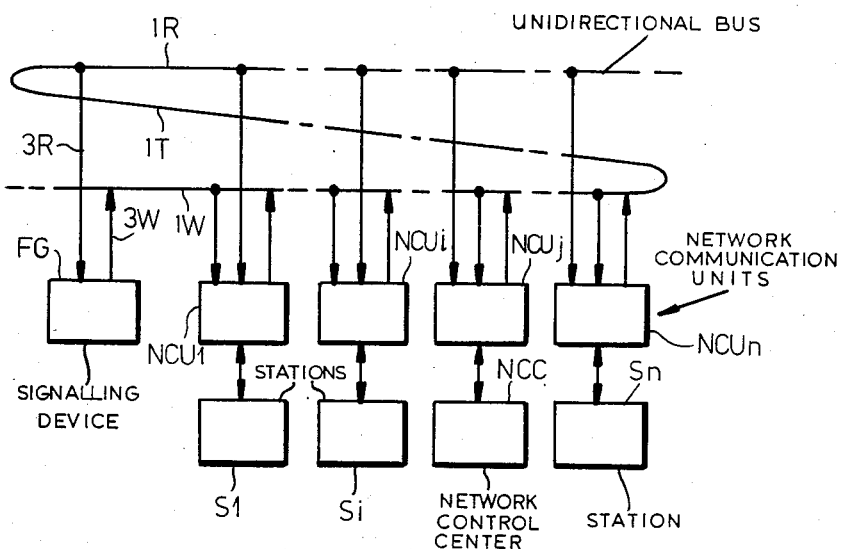
Figure 7:
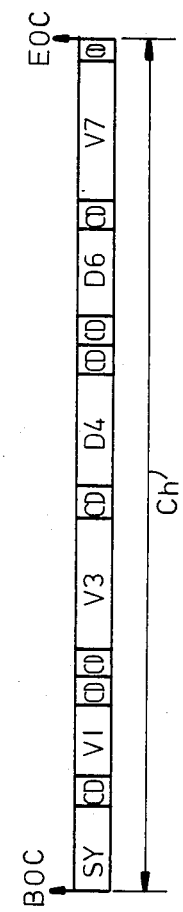

In the scheme of FIGS. 1 and 2 there is a single bus 1 with a writing branch 1W and a reading branch 1R, obtained by folding the bus at one end (FIG. 7) or by a double folding (FIG. 2). In the latter case a "transport branch" 1T connects writing branch 1W and reading branch 1R.

Units NCU are connected to the bus by passive couplers, i.e. no regenerator is provided in correspondence with the units. In this case the signals generated by FG can consists of bursts of unmodulated carrier of different durations.

The block diagram of one of the units NCU, in case of the network structure shown in FIGS. 1 or 2 and of a passive optical fiber bus, is represented in FIG. 3. The unit comprises a first part MAU for connection to the bus, another part ACM managing the access and storing packet-switched and circuit-switched information flows, a further part PH handling the packet flow (packet-switched traffic and signalling which is transmitted in packet form), and finally an interface AIH towards the stations, which separates or recombines both kinds of traffic. The information flow path has been schematised by double-line arrows, and local signalling path by single-line arrows.

MAU comprises emitter TX for transmitting on the bus the information originated in the stations connected to the unit, and two receivers RX1, RX2; the first receiver is connected to writing branch 1W to detect the activity of the upstream units and the second is connected to reading branch 1R to extract the information addressed to the stations connected to the unit. AW, AS, AR denote the couplers for TX, RX1, RX2; it is to be noted that AS is placed upstream of AW, to prevent a unit from detecting its own activity.

Transmitter TX and the receivers are connected to an electrical interface IE, connected in turn to ACM. ACM comprises access protocol managing devices APH and storing system ME which receives from AIH the circuit-switched information flows and from PH packet-switched traffic. ACM will be shown in greater details in FIG. 10.

According to whether bus 1 presents two folding points or only one units NCU transmit and receive in the same order on in inverse order. That obviously implies variations in access modalities and in signals FG is to generate, as will be better seen hereinafter.

Topologies similar to those of FIGS. 1 and 2 can also be used in case signal regeneration takes place in correspondence with units NCU. In this case the units are connected by a receiver and a transmitter to both the writing and the reading branches of the bus and devices are provided to insulate from the bus a NCU in case of failure. The remaining structure of NCU is identical to that of FIG. 3.

A double ring structure like that of FIG. 4 is also possible, in which transmission occurs in opposite directions on the two rings. Units NCU1 ... NCUn are connected point-to-point by two lines 1A, 1B beginning and ending in correspondence with the two generators FGA, FGB. In each line the trunk upstream of a station (or of a generator) forms the reading branch, the one downstream the writing branch.

In correspondence with the different units, the buses enter a receiver and exit from a transmitter; the units transmit on one or the other of the two buses, according to whether the destination unit is more upstream or more downstream with respect to one of the generators FGA, FGB. This structure basicaly allows a double network capacity, but entails the duplication of devices MAU, APH and the necessity for each station to know the mutual position of the others. Obviously it is to be predetermined which of the two buses is to be used in case of information intended for another station connected to the same unit NCU.

From what already mentioned it derives that, whatever the scheme adopted, units NCU are arranged in ordered sequence along the bus, for both transmission and reception. That immediately suggests the choice of an ordered protocol, in particular a Round Robin protocol. Here, a number of "rounds" are established an in every "round the units having information to be transmitted are allowed to intevene at least once but only once; the unit more distant from the bus folding point, i.e. the unit farthest upstream, can intervene first and the other stations can follow in downstream succession. Once the most dowstream unit has completed transmission, a new round can begin. This protcol is very efficient and is not critically dependent on the network size and hence on the propagation time. Moreover it limits the transmission delay of a packet (sum of the bus access time, the transmission time and the propagation time) to a maximum predetermined value.

In opposition to what described in the above cited Patent Application No. 67736-A/82, where the ordered-access protocol concerned only data (asynchronous) communications, in the present system the access in rounds concerns both circuit-switched and packet-switched communications; in this way a better services integration is obtained and the structure of the communication control devices is highly simplified. As to circuit-switched communications the frame will contain just one round during which each unit occupied a channel which is allotted the band actually required in that frame by the information to be transmitted (circuit region); for packet-switched communications, a frame will comprise a variable and even non-integer number of rounds and the rounds possibly interrupted by the beginning of the circuit region of a new frame are resumed in the subsequent frame from the interruption point.

Besides, to increase the system efficiency, the protocol establishes at each instant which station is to access the bus, in order to avoid collisions; to this aim units NCU are numbered in the same order as that used to schedule their access to the bus for transmission and each unit, knowing its serial number, starts transmitting only after recognizing the transmission end or the absence of transmission by the preceding unit.

By a communication management of this kind, signals are to be provided indicating the start of frame (SF), the region boundary (RB) and the start of packet rounds (SR), as well as guard times to recognize the inactivity phases.

signal SF is always emitted by generator FG (or FGA, FGB) whatever the topology adopted. In case of FIGS. 1 and 4, devices FG, FGA, FGB are to generate also signals RB and SR, and hence they are connected to writing and reading branches of the bus. The connection to reading branch is necessary because only by surveying the activity on such a branch, generator FG (FGA, FGB) can recognize the instants at which to emit signals RB, SR. As to FG it is connected to the two branches upstream (for writing) and downstream of NCU1 (for reading) through lines 3W, 3R respectively.

In case of FIG. 2, units NCU can be entrusted with generation of RB, SR. This clearly entails a simplified structure of FG, which merely becomes a clock generator, since the frames are constant. In this case FG can be connected only to the writing branch. If RB or SR are generated by FG, FG is connected to both the writing and the reading branch upstream of NC1, as shown in FIG. 2. However, even in case of a centralized generation of RB and SR, the structure of FG is quite simple, as shown, so that it can be easily duplicated to avoid reliability problems.

Beyond a certain number of stations, and hence of units connected to the system (e.g. 500–1000 stations) problems arise to assure the access to all the stations while keeping the losses within the limits admitted for the service, as well as reliability problems. Hence it becomes convenient to interconnect a plurality of networks as those described with reference to FIGS. 1, 2 and 4 so as to obtain a hierarchic structure with a plurality of low-level networks (collecting networks) and a high level network (or connection network).

The hierarchic structure is also convenient to a modular growth for future expansions, and is in particular convenient when the distances among the users are high or when the users are dispersed in a plurality of buildings.

Figure 5:
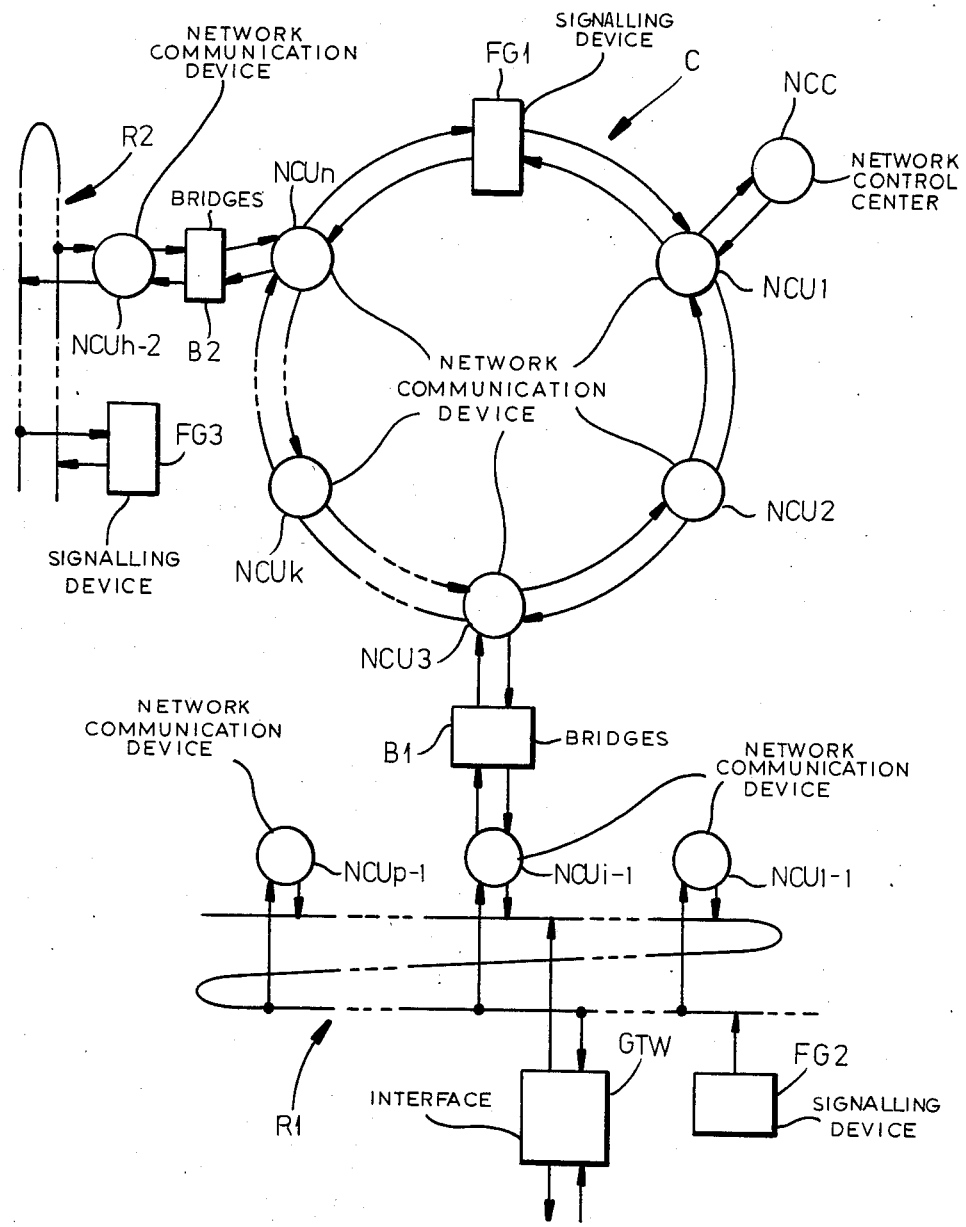
FIG. 5 is a schematic representation of a multilevel system.

An example of hiearchic structure is shown in FIG. 5, supposing that the connection network C is of the double-ring type and is connected to two collecting networks R1, R2 of the type shown in FIG. 2 and FIG. 1 respectively. One of the collecting networks, e.g. R1, is in addition connected to the public network through an interface GTW. The individual networks are connected as already described in FIGS. 1 to 4, the only difference being that certain units NCU (e.g. NCU3 and NCUn) of the connection network are connected through "bridges" B1, B2 to a respective unit (NCUi-1, NCUn-2) of the collecting network. The "bridges" are interfaces having essentially to synchronize the information outgoing from a network with the flows of the network into which this information is to be entered. Of course, the frames on different networks ought to have equal duration.

By a hierarchic system of this kind, the collecting networks are seen by the connection network as stations connected to units NCU of the network itself; hence the information transferred from and/or to one of such networks are processed exactly alike the information transferred from and/or to a station within the network.

The system described is asynchronous, in case of a passivebus topology, or pleisiochronous in case of active network, that is why units NCU are to transmit on the bus the clock information in conjunction with the data, i.e. a self-synchronizing code is to be used. During the transmission phase each unit will transmit with the rate established by its clock generator (even if nominally the transmission rate is equal for all stations) and during the receiving phase each station will become synchronised with the clock signal associated with the received information flow.

In case of active networks as that of FIG. 4, where the transmission is carried out as point-to-point connections between successive units, each unit is to accomplish, when necessary, a "stuffing" to compensate for possible phase shifts between its clock and that of the preceding unit.

Self-synchronizing codes are well known. Considering as an example code CMI, bits 0 are coded by 01, and 00 and 11 alternate in coding bits 1; the pair 10 in steady state is interdicted and is used, as will be seen hereinafter, for particular aims.

Figure 6A:
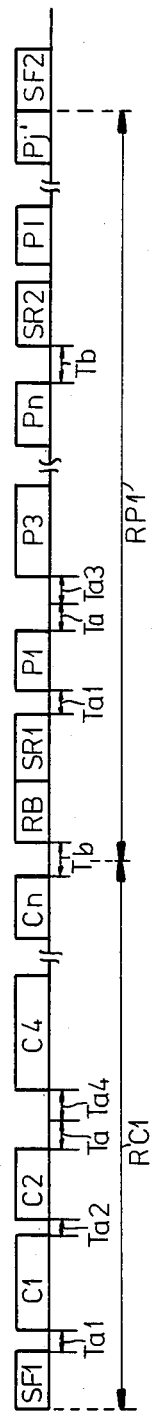
FIGS. 6A, 6B and 7 show an example of information organization for the system of FIGS. 1 and 2.
Figure 6B:
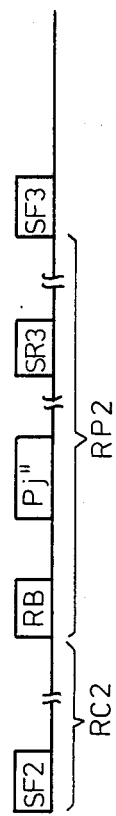

An example of organization of the bus activity, and hence of round and frame organizations, is represented in FIG. 6 for two subsequent frames whose circuit and packet regions are denoted by RC1, RC2, RP1, RP2; SF1, SF2, SF3, SR1, SR2, SR3 denote signals SF and SR relating to the different frames; RB denotes the Region Boundary; $C_i$, $P_i$ ($i=1, 2 \ldots n$) denote the circuit and packet activity of unit $NCU_i$.

For the packet region, it has been supposed that the frame comprises a complete round and a portion of a second round. The latter is interrupted by the arrival of signal SF2 of frame 2 during the activity of station NCUj, which could transmit just a portion $P_j'$ of its information; therefore, in frame 2, after the arrival of signal RB, the activity is resumed by sending on the line the remaining part $P_j''$ of the information to be transmitted by NCUj; once completed the second round, a third round can begin (SR3) which in turn can terminate in frame 2 or be interrupted by signal SF3, and so on.

Here a passive network like that of FIGS. 1 and 2, has been considered under the hypothesis that the modulated carrier is always present during the whole station activity. In this case frame signals SF, RB, SR can be represented by bursts of unmodulated carrier with different durations. Frame development on the bus is followed by the various units NCU thanks to such signals, to the beginning and end of carrier and to suitable carrier latency times. More particularly, the beginning of the activity of the generic station NCUi is separated from the end of activity of station NCU ($i-1$) by a carrier latency time $ta_i$, which depends on the position of the unit with respect to the bus (i.e. on the length of branches 2R, 2S, 2W, FIG. 3) and which is given by the sum of propagation times on such branches and of the time necessary to logic circuits of the unit to recognize the end of carrier and the access right of the unit.

The lack of activity of a station is recognized because the carrier latency time exceeds the guard time Ta equal to the maximum of all times $Ta_i$. For instance in case of transmission rate on the bus of 140 Mbit/s and of branches of the order of ten meters, at most the guard time Ta is of the order of some tens of nanoseconds.

In FIG. 6 it has been supposed a lack of activity of NCU3 in the circuit region and of NCU2 in the packet region; activities C4, P3 will then begin after a time period Ta+Ta4 or Ta+Ta3, respectively, has elapsed after the end of activity of C2, P1.

The "Start of Frame" flag SF must be longer than guard time Ta to avoid overlapping between a packet being trasmitted and the beginning of circuit activity of the first active unit. The end of the circuit round, with consequent need to emit RB, is recognized when the number of end-of-carrier signals and of intervals with duration Ta is equal to the number n of units NCU. Between the end of a circuit round and the emission of RB and between the end of a packet round and the emission of signal SR relating to the subsequent round there is a time of inactivity Tb due to propagation delay; such time is twice the propagation time on the writing branch in case of the topology of FIG. 1, it is the sum of the propagation time on the writing and transport branches in case of FIG. 2, and is equal to the propagation time along one of the rings in the case of FIG. 4.

The end of the packet rounds is recognized like the end of the circuit round.

Although in FIG. 6 also signals RB, SR have been represented, it is to be taken in mind that their explicit transmission is unnecessary in case of the system structure of FIG. 2, as the various units recognize the events on the line in the same order in which they obtain the access right.

As to the organization of circuit activity of a unit, different aspects are to be taken into account. First, generally a plurality of stations are connected to unit NCU, and hence each activity period C comprises a plurality of circuits, which are not necessarily all actives in each frame. Besides a number of circuits (more particularly those assigned to speech communications) can by dynamically managed, e.g. to take into account procedures like DSI, so that a circuit is assigned to a communication only when this one is active; other circuits on the contrary (data circuits, denoting by this term those relevant to non-speech services, i.e. graphics services, videoconferencing, etc.) require permanent allotment to the respective communication and are active for the whole duration thereof. It is hence necessary not only to identify the various circuits in the same activity period, but also to make a distinction between active and non active circuits and between circuits with dynamic or rigid management.

For the identification of individual circuits, each of them can be assigned a pair of numbers, one indicating the number of the unit and the other the circuit position inside the activity period. These numbers will be communicated by the calling station to the called station upon establishment of the connection and are maintained for the whole duration of same, what allows in a very simple way a distributed management of circuit identification in receiving phase. ceiving phase.

As to dynamically-controlled circuits, to ensure a service quality convenient to both speech and data circuit-switched communications, for speech communications a blocking strategy is adopted which, according to the invention, concentrates the losses on units NCU with higher serial number. This simplifies the access, in fact in each frame it is sufficient for an NCU to count the speech circuits already existing and only if their number has not reached a predetermined maximum number, a new speech circuit can be transmitted. The counting is simplified by the use of an odd-even arrangement for both circuit types. In the example of organisation depicted in FIG. 7, it is supposed that speech communications are assigned odd circuits and the others even circuits. Such a Figure shows the case of a unit handling seven circuits; circuits $V_j$ ($j=1,3,5,7$) are assigned to speech communications, circuits $D_k$ ($k=2,4,6$) are allotted to data communications. SY denotes a synchronism word containing clock information and, as mentioned, has to be transmitted by each station.

With the above assumption that the modulated carrier is present for the whole duration of the activity of a station and that code CMI is used for transmission, out-of-code bit pair "10" can be used to indicate both the end and the lack of an event during the activity of a unit. The term "event" refers to both the synchronism word, and the information relating to a circuit. Such bit pair will be repeated a number of times (e.g. 4) for reliability reasons. In the Figure the delimiting sequence is denoted by CD supposing that in the period represented circuits D2 and V5 are not active, two delimiting sequences will be transmitted between V1 and V3, and between D4 and D6 one sequence indicating the end of circuits $V_1$ or $D_4$ and the other the lack of $V_2$ or $D_5$, respectively. Delimiting sequences CD are recognized by the decoder of devices MAU (FIG. 3) of the unit; by counting such sequences the station can immediately recognize when it has processed all communications.

The same organization can be used for packet activity with the only difference that all the packets emitted by a unit are grouped together; i.e. the lack of activity is not to be signalled. In case of interruption due to the beginning of a frame, the station activity will be resumed by transmitting first the synchronism word and then the packet possibly interrupted by the arrival of SF.

In case of a network with regeneration, as a rule, the modulated carrier will be always present and frame signals and inactivity times can be then represented by suitable bit configurations; more particularly the inactivity times will be represented by synchronism information; in addition the beginning and the end of activity of a station are to be suitably encoded.

FIG. 8 shows frame signal generator FG for a passive network, in the most general case in which all the signals are actually transmitted. The generator comprises three circuits SFH, RBH, SRH for processing "start of frame" signal SF, "region boundary" signal RB and "start of packet round" signal SR; the last two circuits are connected to a circuit FRR for frame and round recognition. All these circuits are connected to a device F1, which has basically the same functions as block MAU in FIG. 3, except for the detection of the activity on writing channel. Signals SF, RB, SR emitted by circuits of FG are then commands for suitable generators of unmodulated carrier present in F1, which generators in turn will send on the bus the homonymous frame signals.

That stated, circuit SFH basically consists of a counter of the pulses of a clock signal CK, having a frequency equal to the transmission rate on the line: SFH counts up to a pre-determined number corresponding to a frame duration and, at the counting end, emits signal SF.

Detector FRR operates on the ground of the activity on the bus reading branch, and receives from F1 signals BUR, EUR indicating the beginning and the end of unmodulated carrier on such a branch, and clock signal CKS associated to data; FRR generates a signal SFR indicating the beginning of a frame on the reading branch (signal which is sent to both RBH and SRH), and signals RBR, SRR indicating the region boundary and the beginning of a packet round on said branch: both these signals are supplied to SHR. Detector FRR can be a counting system counting the pulses of CKS occurring between BUR and EUR and emits signal SFR or RBR or SRR when the number of pulses received reaches one of three predetermined values corresponding to the durations of the three frame signals.

Circuit RBH is to generate signal RB at the end of the circuit region. It exploits start of frame signal SFR, supplied by FRR, and signals BAR, EAR supplied by F1 and indicating the beginning and end of circuit activity of a unit NCU; as said, circuit region end is detected when the number of active units NCU, added to the number of time in which guard time Ta is reached, is equal to number n of the units associated with the system. Thus RBH can be a counter which is reset at each frame and is advanced by one step either by the pair of signals BAR, EAR or by a signal indicating the end of guard time Ta, up to the attainement of number n.

Figure 9:
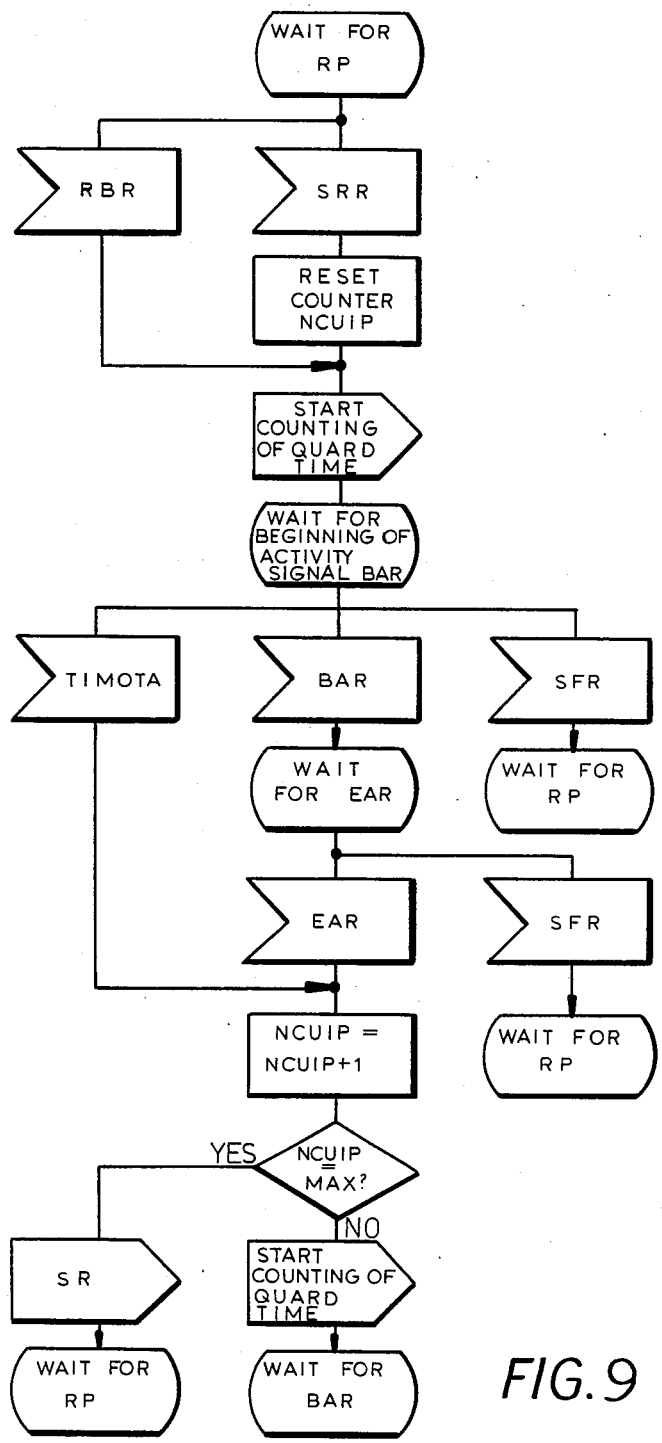
FIG. 9 is a diagram of the operations of one of the circuits of the generator of FIG. 8.

Circuit SRH is to generate signal SR, when all units NCU with packets to transmit have accessed the bus. Even SRH will basically consist of a counting system which, for every packet round, counts the number of active units or the number of times guard time Ta is exceeded, and emits signal SR when maximum value n is attained. This counting system is to take into account that the duration of packet rounds is independent of that of the packet region and hence a frame may comprise a plurality of rounds or a round may extend over a plurality of frames. A flow chart of the operation of SRH is shown in FIG. 9. Implementation of a circuit operating according to such flow chart presents no problem.

As mentioned, SRH operates in the packet region, and hence it leaves the initial state (wait for RP) each time it receives signal RBR or signal SRR. In the latter case a counter NCUIP of the number of units accessing the bus during the round is reset. The arrival of signal RBR indicates on the contrary that a round already initiated in a preceding frame has not been terminated and hence the counter is not to be reset.

After the arrival of RBR or SRR, the counting of guard time Ta is started (STARTA) and a beginning of activity signal (BAR) is waited for. The start-of-frame signal SFR can arrive before BAR thereby causing the return to the initial state, on the guard time Ta can elapse (TIMOTA). The arrival of signal TIMOTA indicates the lack of activity of a unit and causes counter NCUIP to advance. After the arrival of signal BAR, SRH waits for the end of packet activity of the unit and, when the end is detected (EAR), it increments counter NCUIP. Instead of EAR the start-of-frame SFR can appear again, and as before causes the return to the initial state. The described operations are obviously repeated up to the attainment of the terminal count of NCUIP, which causes emission of SR.

FIGS. 10-17 show in greater detail the structure of devices ACM of a unit NCU, in case of a network which uses only passive components. For this description it is supposed that FG esplicity generates all the frame signals and hence it has the structure of FIG. 8. In these Figures, signals representing the events on the two branches 1R, 1W of the bus have been denoted by symbols ending with letters R, W respectively.

As shown, both devices APH handling the access protocol, and storing devices ME comprise two portions assigned to packets and circuits, respectively; besides, APH comprises a device MB monitoring the activity on the bus.

As to devices ME, the portion concerning the packets comprises for instance two FIFO memories, one for packets to be transmitted and the other for packets received. The two memories are schematized with their control devices by block MPK; 4a, 4b indicate the wires conveying packets to be forwarded on the bus and packets received; line 6 schematises the connection with PH (FIG. 3) both for information and for local signalling.

As to the part concerning the circuits, ME comprises a plurality of buffers MT1 ... MTh, MR1 ... MRk for the information to be transmitted or received. Each buffer is associated with its own controller for read and write operations; for simplicity sake there are shown only devices CTX1, CRX1, relating to MT1 and MR1. The memories are connected on one side to a switching matrix SM connected through lines 7a, 7b, to AIH (FIG. 3); on the opposite side they are connected to wires 5a (buffers MT) and 5b (buffers MR) through multiplexing-demultiplexing and parallel-to-series/series-to-parallel converting devices, not shown. The controllers are in turn connected to a control logic network CC for the circuits and to devices of APH.

As an alternative, when a high number of lines 7 is present, so that a great number of buffers MT, MR would be necessary, a single RAM memory could be used, in which the addressing devices signal the beginning and end of memory region allotted to a channel. That makes it easier to implement units NCU in integrated form.

Logic CC is to enable or disable controllers CTX, CRX, to set up the connections between lines 7 and memories MT, MR through matrix SM on the basis of information received from PH through a line 8, and to supply the devices of APH with signals enabling or disabling the reception, with information on the number of circuits to be received and, in case of dynamic speech circuit management, on the state of emission/pause of an active circuit in transmission phase.

In devices APH, circuit MB has tasks analogous to circuit FRR of FIG. 8, yet with relation to both bus branches; thus it will comprise a pair of circuits like FRR; the only difference is that the element associated with the reading branch is not to emit signal SRR, wich is not used inside unit NCU.

The portion of APH assigned to packets consist of two different parts designed to control packet transmission towards and reception from the bus. The transmission part is composed of two logic networks PAR, PTC. The first recognizes the right of access to the bus during the packet region by the unit it belongs to, on the basis of the frame signals concerning the bus writing branch (SFW, RBW, SRW), supplied by MB and of the events on such a branch (beginning- and end-of-activity signals BAW, EAW, supplied by MAU).

The second network exchanges with MAU and MPK the signals necessary to control packet transfer from MPK to the bus with the already described modalities.

The receiving part PRC recognizes the packets to be forwarded to the station it belongs to, on the basis of the address coded in the packet heading, and exchanges with MAU and MPK the signals necessary to forward to and to temporarily store in MPK the packets correctly received (i.e. packets which have not undergone collisions). For its operations PRC is then connected to wire 4b and in addition it receives from MB the frame signals relevant to the reading branch.

Even the part of APH relevant to the circuits is subdivided into two device groups handling transmission and reception. Transmission handling devices comprise, in addition to logic networks CAR, CTC for access right recognition and for transmission control (which have functions equal to PAR and PTC) a further logic network DSI which, in case of circuit-switched speech communications to by dynamically processed, enables or not the transmission of the relevant information according to band availability on the bus. The receiving part (circuit CRC) enables receivng controllers CRX to control the transfer, from wire 5b to memories MR, of the information flows relevant to circuit communications addressed to the unit they belong to, on the basis of the signals supplied by CC, of frame signals and of activity signals on the reading branch.

If a network with regeneration in each unit NCU is considered instead of a passive network, handler APH will not comprise circuit MB; in fact, as reported, the various frame signals and the beginning and end of activity of a station are represented by suitable bit patterns: unit MAU then comprises a number of decoders recognizing the various events and directly sends frame signals and the beginning- and end-of-activity signals to the various circuits of APH.

Figure 10:
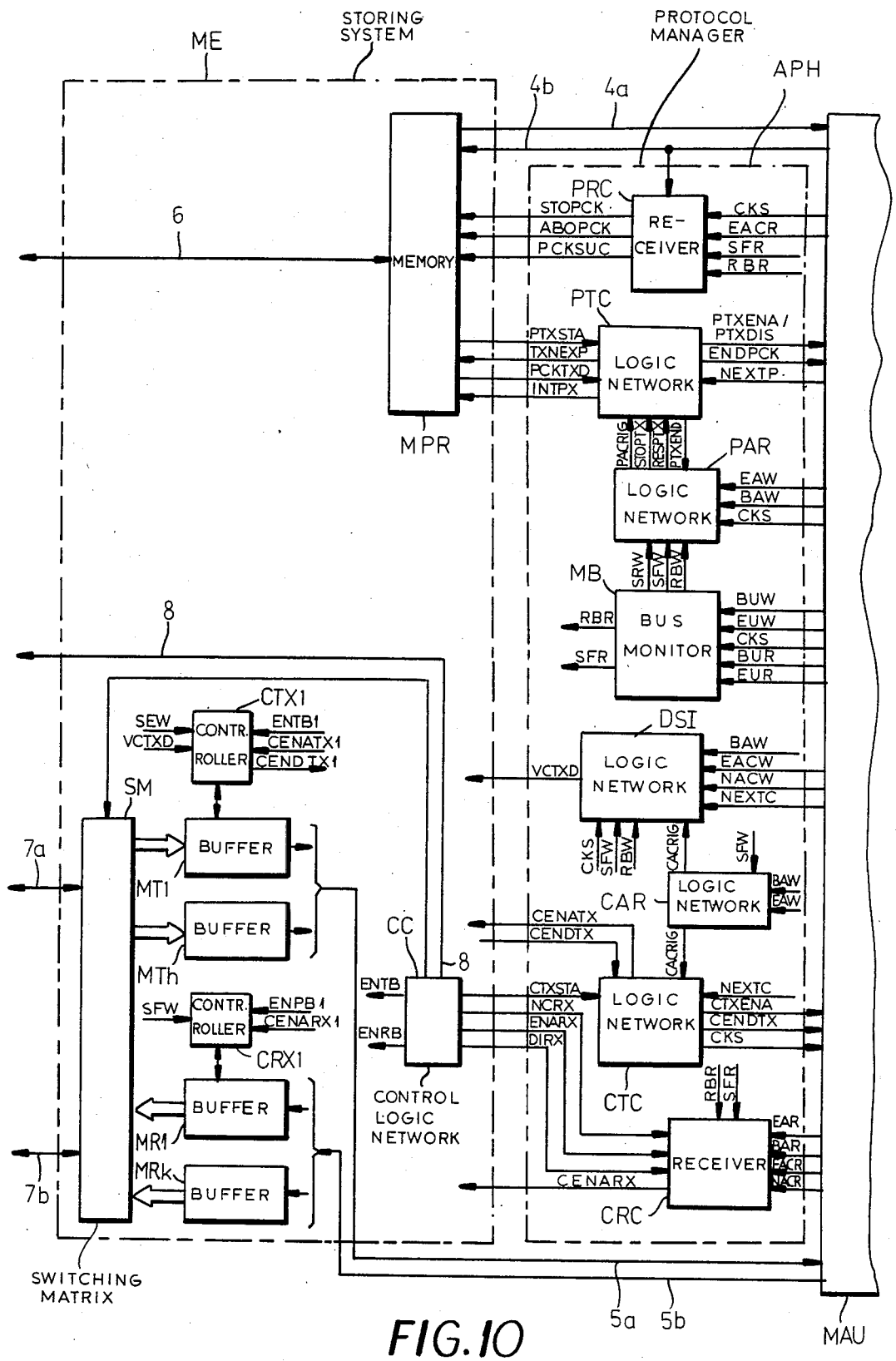
FIG. 10 is a more detailed block diagram of logic network managing the access protocol in a unit.

FIGS. 11–16 show a possible circuit implementation of blocks PAR, PTC, PRC, CAR, CTC, DSI and CRC; as to CC, a flow chart of this operation is given. The meaning of the various signals indicated in FIG. 10 will become apparent from the description of these Figures. In FIG. 10 the clock signals are denoted by CKS, without making any distinction between transmission and reception, as possible phase-shifts between transmission and reception have no interest to the description purposes. Signal CKS normally has the same frequency as CK (FIG. 8); yet a different symbol has been used as in case of a centralized generator of the only signal SF, block FG will have its own oscillator.

Figure 11:
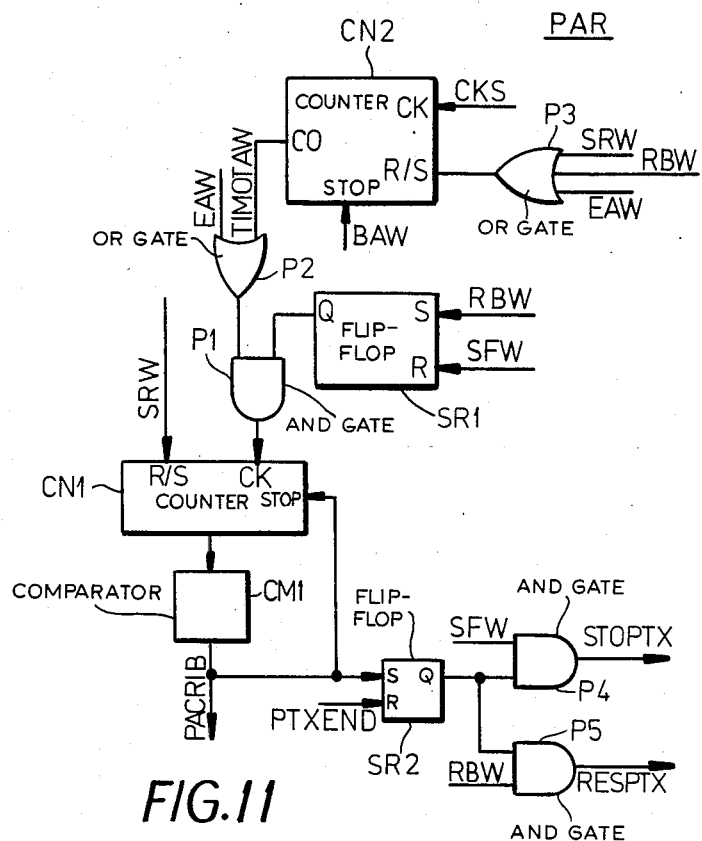
FIGS. 11 to 16 are circuit diagrams of some blocks of FIG. 10.

With reference to FIG. 11, logic PAR is to communicate to PTC (FIG. 10) the right of access to the bus for packet transmission (signal PACRIG), to interrupt the packet round at the start of a new frame (signal STOPTX) and to resume in the subsequent frame the interrupted round (signal RESPTX). To this aim, the logic comprises a counter CN1 which is started and reset at each round by signal SRW and counts the pulses present at the output of an AND gate P1.

Gate P1 is enabled by the output of a set-reset flip-flop SR1 which is set by signal RBW and reset by signal SFW, i.e. P1 is enabled during the packet region. Gate P1 supplies CN1 either with the end-of-activity signal (EAW) or with signal TIMOTAW, indicating that guard time Ta is elapsed. These signals are supplied to P1 through an OR gate P2. Signal TIMOTAW is for instance the carry out of a second counter CN2 which is reset and started by signals SRW or RBW or EAW (supplied to CN2 through an OR gate P3) and which counts clock signals CKS up to the arrival of a signal BAW. The start of CN2 by EAW is the usual start of the counting of the time separating the activities of two units; the start by SRW or RBW takes into account the possibility that the first unit(s) are not active in that round, or that a unit cannot resume transmission after stopping packet activity.

The current count of CN1 is supplied to a comparator CM1 which stores the serial number of the unit it belongs to and emits signal PACRIG when the current count of CN1 is identical to such a number. Signal PACRIG stops the count of CN1 and sets a second set-reset flip-flop SR2, which is reset by a signal PTXEND supplied by PTC (FIG. 10) to indicate the end of packet activity by the unit. Output Q of SR2 is connected to two AND gates P4, P5, which, in coincidence respectively with signals SFW and RBW, send PTC signal STOPTX stopping packet transmission and signal RESPTX causing transmission restart.

A similar scheme serves also for circuit CAR, which yet has only to emit signal CACRIG, denoting access right recognized, towards CTC and DSI (FIG. 10), since a circuit round concides with the frame circuit region and cannot be interrupted. Counter CN1 or CAR will be then started by SFW, and counter CN2 will be started either by EAW or by SFW. Of course SR2, P4, P5 will be missing.

Figure 12:
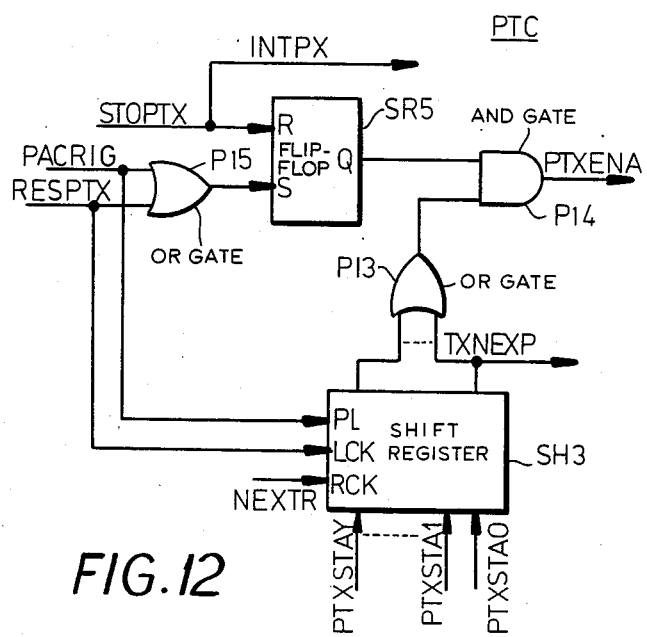

In FIG. 12 packet transmission control circuit PTC comprises a shift register, receiving a pattern of pits bits PTXSTA0 ... PTXSTAy. Bit PTXSTA0 is 0 and the other y bits, whose number is equal to the maximum number of packets which can be transmitted, indicate, when at 1, packets to be actually forwarded on the bus during a round. It is to be appreciated that the bits at 1 are consecutives since, as mentioned, there are no inactive "channels" inside the packet activity of a unit and such bits at 1 are the most significant bits, after PTXSTA0. SH3 receives signal PACRIG as a parallel load command and signal NEXTP, through which MAU requests new packets, as a command for bits shift towards the most significant positions.

The outputs of all the cells of SH3 are connected to an OR gate P13, whose output signal is at 1 as long as there are packets to be transmitted (i.e. as long as there are bits at 1 inside SH3); such an output signal is transferred to MAU through an AND gate P14 as signal PTXENA enabling packet forwarding on the bus. In addition the most significant bit of the pattern, present at a given instant on the outputs of SH3 forms a signal TXNEXP by which PTC requests MPK (FIG. 10) the sending of a packet on wire 4a.

A second input of P14 is connected to the output of a set-reset flip-flop SR5 which is set by signals PACRIG or RESPTX supplied by PAR (FIG. 10) through OR gate P15 and is reset by signal STOPTX, it too supplied by PAR. Signal STOPTX is also forwarded to MPK (signal INTPX) to block packet transmission over wire 4a. Signal RESPTX controls the backward shift in SH3.

By this arrangement, as soon as logic PAR recognizes the right of access PACRIG for the unit it belongs to, if such a unit has packets to be transmitted (at least bit PTXSTA1 at 1), PTXENA is emitted so that MAU is ready to request the packets; in addition, being PTXSTA0 at 0, signal TXNEXP is still at 0.

When MAU, after having prepared the synchronism word and flag CD relevant to it, sends signal NEXTP, the shift of bits in SH3 brings PTXSTA1 on the most significant output, so that TXNEXP passes to 1 and causes MPK to send the first packet to MAU. Supposing that the round is not interrupted, operations go on in this way until the transmission of the last packet. At the arrival of the subsequent signal NEXTP there are no more bits at 1 in SH3 and hence the output of P13 and P14 pass to 0, thereby signalling the transmission end to MAU.

In case of interruption of the round, the emission of STOPTX by PAR (FIG. 10) causes MPK to stop packet forwarding and causes the passage to 0 of PTXENA, notwithstanding the output of P13 is still at 1.

The transmission is restarted at the arrival of RESPTX, in this case, to avoid loss of a packet which has not been completely forwarded, RESPTX causes a backshift by a position of contents of SH3, so that at the arrival of NEXTP transmission can restart from the interrupt point (this obviously requires the presence in MPK of a counter of the packets transmitted, which is blocked by INTPX).

Signals PCKTXD, ENDPCK indicating end of transmission of a packet are not shown in FIG. 12. In effect, even if in FIG. 10 they are represented as two separate signals, PTC is transparent to PCKTXD which can directly arrive at MAU to cause emission of CD.

Figure 13:
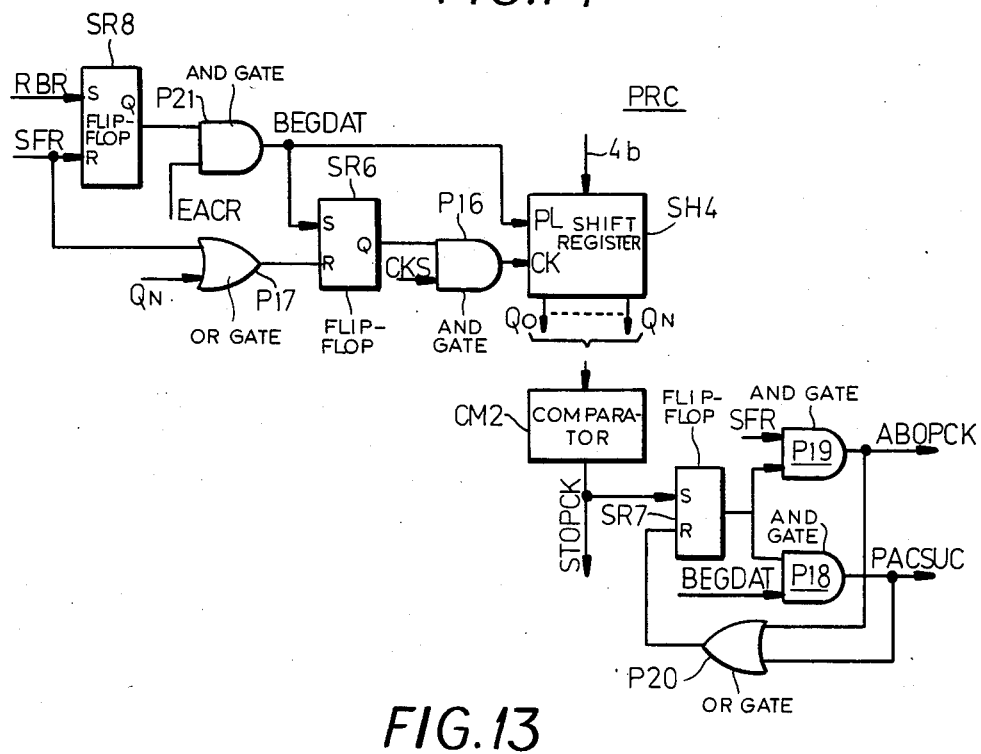

In FIG. 13, logic PRC comprises a shift register SH4 loading in series the bits encoding a packet destination address (wire 4b); once the loading is completed, the bits are supplied to a comparator CM2 where the address of the unit PRC belongs to is stored. These bits are denoted by $Q_0 ... Q_N$, where $Q_N$ is the last address bit.

SH4 is reset at each packet by a signal BEGDAT indicating the packet start. Such signal can be generated through an AND gate P21 which receives at an input signal EACR (indicating a channel end and generated by MAU by decoding flags CD) and has the other input connected to output Q of a set-reset flip-flop SR8, set by RBR and reset by SFR. The shift command is given by clock signal CKS, associated with the data. This signal is supplied by SH4 through AND gate P16 which has a second input connected to the output of a set-reset flip-flop SR6 which is set by BEGDAT and reset through OR gate P17 either by signal SFR or by the completion of the address storage in SH4 (bit $Q_N$).

The output signal of comparator CM2, indicating the equality among the addresses, forms a signal STOPCK enabling the packet storage in MPK; the same signal STOPCK enables, through a set-reset flip-flop SR7, two AND gates P18, P19 which receive at the other input signals BEGDAT and SFR. AT the oututs of such gates there are signals PACSUC and ABOPCK, which are sent to MPK to signal whether the packet has been correctly received or not, the same two signals through OR gate P20 and SR7 disable P18, P19. The first signal BEGDAT (emitted at the end of SYNC) has no effect on P18, which is disabled because STOPCK has not yet been emitted; analogously the last signal BEGDAT (end of the last packet) does not effect SH4, which no longer receives data.

Figure 14:
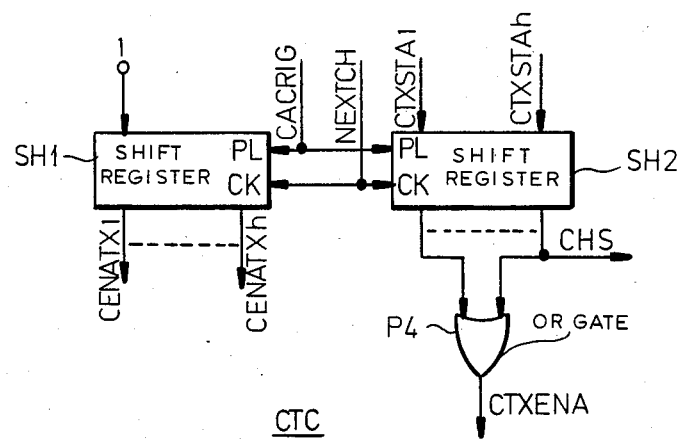

In FIG. 14, circuit transmission control logic CTC comprises two parts, the first enabling the controllers of memories MT1-MTh (through signals CENATX) and the second enabling information transfer in MAU from wire 5a to the transmissione line.

The first part comprises a shift-register SH1 with h positions (h=number of memories MT), enabled by CACRIG and implemented such as to sequentially present on its outputs a bit 1, beginning from the instant of arrival of a shift command NEXTCH sent by MAU to request the transfer of information relevant to a channel by the corresponding memory MT.

The second section consists also of a shift register SH2 analogous to SH3 (FIG. 12) and controlled by signals CACRIG and NEXTCH in the same way as SH3 is controlled by NEXTP and PACRIG. SH2 receives from CC (FIG. 10) bits CTXSTA1 ... CTXSTAh which, when at 1 indicate the active state of the respective channel. The outputs of SH2 are connected to an OR gate P4, similar to P13 (FIG. 12), whose output signal forms signal CTXENA (having the same meaning and the same effects as PTXENA). In addition the signal present at each instant at the output of SH4, corresponding to the most significant bit is sent to MAU as signal CHS, which indicates the active state of the channel to be transmitted. In case of inactivity, the logic value 0 of CHS causes in MAU the emission of the only signal CD. OF course, since the circuit activity is not interrupted the possibility of a back shift, as in SH3 is not provided for. In addition, any of bits CTXSTA can be 1 or 0, as temporarily circuits inactive can be present between the active ones.

Logic CTC is also to signal the end of a circuit (signal CENDTX) to MAU; this signal can be obtained e.g. as a logic OR of signals CENDTX1 ... CENDTXh emitted to the same end by memory controllers.

Figure 15:
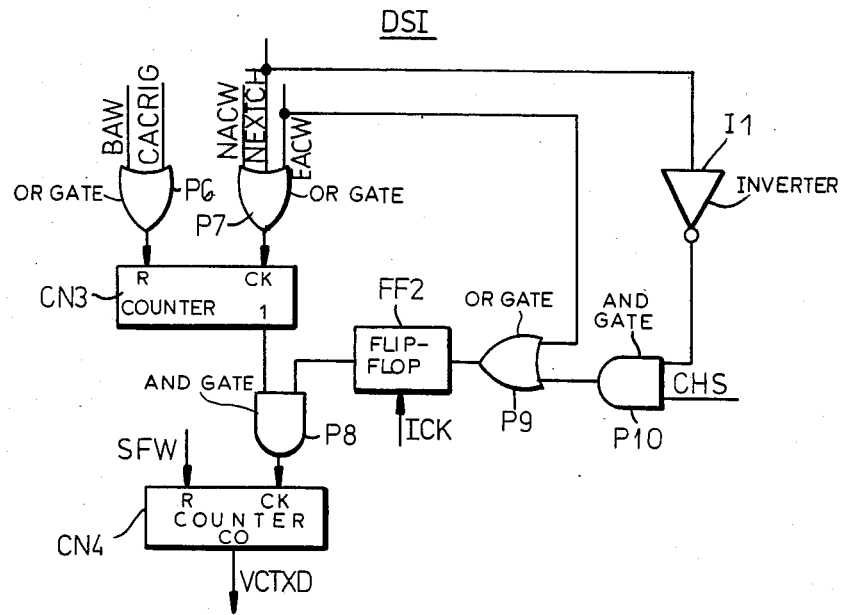

With reference to FIG. 15, circuit DSI is to recognize during a frame the speech channels on the basis of the odd-even arrangement and disable the transmission of information of speech channels after the attainment of the maximum number.

To this aim DSI basically consists of two counters CN3, CN4. The first is a modulo-2 counter started through an OR gate P6 by signal BAW (for recognizing speech channels of upstream units) or signal CACRIG (for the channels of the unit it belongs to); CN3 counts signals EACW (end of an event on the writing channel) or signals NACW (inactive channel) or still signals NEXTCH, received through an OR gate P7. Signals EACW, NACW (relevant to the activity of upstream units) are supplied by MAU on the basis of detection of flags CD. The initial counting value of CN3 will be established so as not to take into account signal EACW corresponding to the end of synchronism word. Signal NEXTCG refers on the contrary to the station activity.

Supposing, as before, that speech communications are assigned to odd channels within a station activity, the output signal of CN3 corresponding to count "1" forms the clock signal for CN4. Such signal is transferred to CN4 through an AND gate P8. The transfer is enabled by the output signal of a D-type flip-flop FF2 (controlled by a suitable clock signal ICK), which stores either signal EACW or request NEXTCH for another channel, provided such a channel is active (signal CHS), as schematised by OR gate P9 and by AND gate P10. Signal NEXTCH is to be delayed to allow the arrival of CHS; the delay is schematised by inverter I1.

Counter CN4 is reset at each frame by SFW and emits as carryout signal VTCXD disabling controllers CTX. According to the value preset in CN4, VTCXD can indicate either the last channel which can be transmitted, or a channel which can no longer be transmitted. In that second case, reading commands for memories MT must be delayed so as to allow generation of VTCXD; in the first case, on the contrary it will be sufficient to memorize VTCXD into a register, which keeps it present from the instant of its generation up to the beginning of the subqunet frame.

Figure 16:
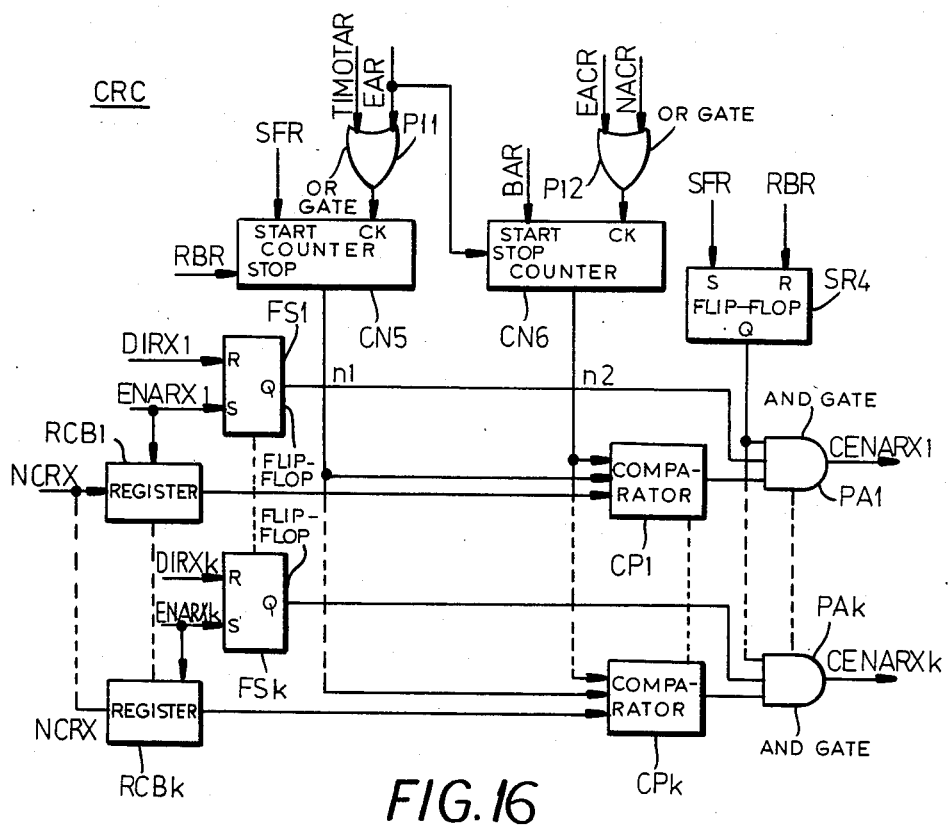

With reference to FIG. 16, logic CRC is to enable the storage in memories MR1 . . . MRk of the information present on wire 5b and relating to different communications, CRC will then comprise k elements (one for each memory), which are enabled and disabled by signals ENARX1 . . . ENARXk, DIRX1 . . . DIRXk supplied by logic CC (FIG. 10) handling the association between memories and communications, and which emit an enabling signal CENARX1 . . . CENARXk for controller CRX of the respective memory.

Each element comprises a register RCBi (i=1 . . . k) which, upon command of the relevant signal ENARXi, stores a bit pattern NCRX, supplied by CC and representing a pair of numbers n1, n2 identifying the individual communications. This bit pattern is supplied by RCBi to a respective comparator CPi, which compares it with the values supplied by a pair of counters CN5, CN6 and emits an output signal when the two pairs of numbers are equal.

The first of these counters is desgined to supply number n1 of the unit which is active at a given instant of the circuit region; hence CN5 is started by signal SFR (start-of-frame on the reading branch) and stopped by signal RBR, and it counts signals TIMOTAR (guard time elapsed on the reading branch) or EAR supplied to it through an OR gate P11. Signal TIMOTAR is generated as signal TIMOTAW used in circuit CAR.

The second counter is to count number $n_2$ of the channels inside the activity period, and hence it is started by signal BAR, and stopped by signal EAR and it counts signals EACR or NACR it received from gate an OR P12. What stated for EACW holds true also for the counting of EACR.

The signal outgoing from comparators CP1 . . . CPk can be emitted during circuit region as signals CENARX1 . . . k, through AND gates PA1 . . . PAk, as long as the relevant channel is enabled. Hence a gate PAi will receive as enabling signals the signal present at output Q of a set-reset flip-flop SR4, set by SFR and reset by RBR, and the signal present at the output of a set-reset flip-flop FSi (i=1 . . . k), set by ENARXi and reset by signal DIRXi indicating circuit disabling.

Logic CRC instead of consisting of k separate elements, could comprise a single memory, addressed by counter CN5 and storing in each position a coding of the channels to be received.

Figure 17:
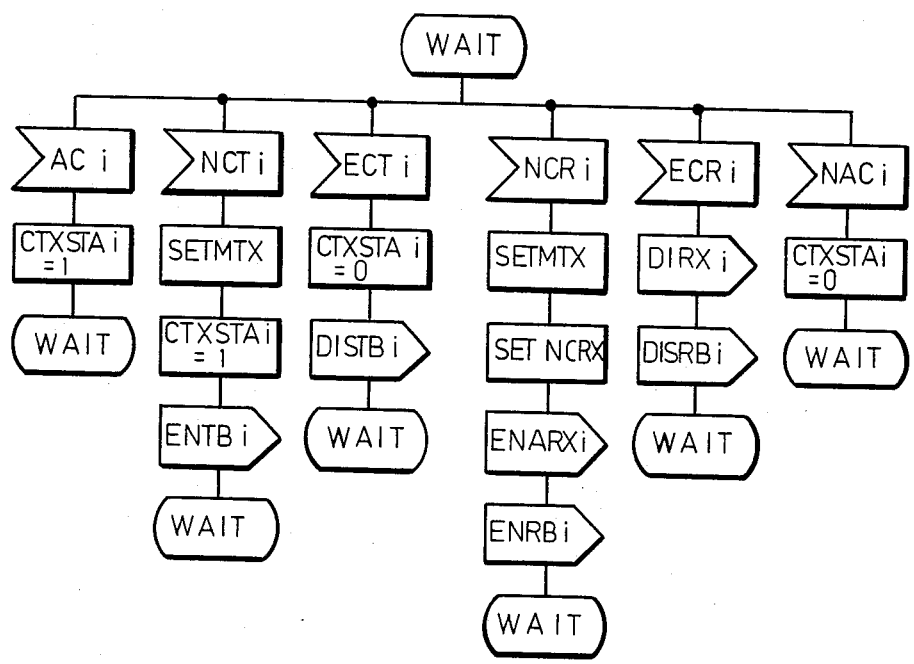
FIG. 17 is a flow chart of the operations of a further block of FIG. 10.

Reference will now be made to FIG. 17. Considering first an outgoing communication, CC receives from PH (FIG. 3) the information relevant to memory MT and to line 7 interested in the communication (NCTi) adn as a consequence it sets up the connection between the line and the memory through matrix SM. Once affected such a connection (SETMTX) CC sets to 1 signal CTXSTAi relevant to such a memory and enables controller CTXi (signal ENTBi). For a communication which does not require a dynamic management, the situation remains unchanged up to the release. For a communication dynamically managed, CC receives, e.g. by the user, signals NACi, ACi indicating the state of pause/emission of the source in the frame, and sets (or keeps) as a consequence to 0 or to 1 CTXSTAi, as the case may be. The actual possibility of transmission depends then on the decisions made by DSI (FIG. 10). The release is signalled by PH through signal ETCi which causes CC to set at 0 CTXSTAi and disable CTX (signal DISTBi).

For the reception, the information necessary to set up the connection between a memory MR and a subscriber line, are again supplied by PH (signal NCRi), in conjunction with the indications relevant to the position of reception channel within the station activity; in this case CC, besides controlling the connection through SM (SEMTX), can supply CRC with bit pattern NCRX (SETNCRX) and the register involved with the enabling signal ENARXi.

After the enabling of memory MR (ENRBi), CC waits for the release (ECRi), which is processed as that relevant to the transmission. It is to be considered that for dynamically controlled communications it is necessary to interrupt the reading from memories MR during channel pause periods; that can be obtained in controller CRX by detecting and signalling to the subscriber the absence of clock signals, which means the absence of valid data.

The operation of the device of a unit for the transmission and reception of information clearly appears from the above description, and funther details are unnecessary. Only a number of remarks will be made concerning the communication set up and release.

Both circuit-switched and packet-switched communications require at the beginning the intervention of network controller NCC; in fact only NCC stores the associations between subscribers and NCUs, and then NCC is to supply the calling party with the data necessary to reach the called party. In addition, band availability for the new communication is to be ascertained. In case of a packet-switched communication the possible unavailability at the request instant causes solely a delay in the set up of the communication which is always accepted. In case of circuit-switched communications, the band unavailability, at the request instant, renders the set up of the communication impossible. A band negociation could even be possible, that is the subscriber can begin the communication with a reduced band and subsequently obtain the complet band. An example can be videotelephony: in case of initial unavailability of the whole band required, the phone communication can be immediately set up and the video communication will be set up afterwards. Still in case of a circuitswitched communication, once ascertained the possibility of setting up the communication the calling party is still to supply the called party with the information concerning the channel used.

Once the communication has been set up, the network controller is no longer involved and the communication is exclusively controlled by the NCUs involved. The controller must be informed of the communication end, as it cannot discriminate between the end of a communication and a pause in case of dynamic control.

The above description is given only by way of non limiting example and variations and modifications can be made without departing from the scope of the invention.

For example, a centralized generator FG has been considered above at least for the generation of signal SF: yet, in case of a configuration like that of FIG. 2, generator FG could be associated with each unit and, as before, could explicitly generate only SF or all the signals. As to generation of SF, the clocks of all units NCU synchronize themselves at each frame with the instant of recognition of signal SF generated by most upstream unit NC, and therefore, when time Z from the recognition of signal SF has elapsed, the sending of such a signal onto the line is automatically enabled. Possible overlapping of more signals SF has no consequence. Thanks to the fact that each unit counts time Z to establish the instant of emission of SF, collisions are avoided between the last packet of a frame and signal SF, because the unit can automatically interrupt packet transmission when time period z is about to elapse.

This frame signal management might give rise to problems for the activation of a unit upstream of already active units, as such a unit is to determine its instant of emission of SF. Yet this instant can be easily recognized by counting the time elapsed between the end of circuit activity and signal RB on the bus reading branch and anticipating by such a time the emission of SF with respect to the duration Z of the frame: in fact this time is constant for all the units, since it is given by the propagation delay from the writing point to the reading point—which delay in a twice-folded bus is equal for all the stations—plus the propagation time on branchings 2 (FIG. 3), which however is compensated by SF. In addition, still with the explicit emission of all the frame signals, the same unit generates SF as well as RB and SR, since the unit which transmits first (and then generates SF) is also the first which recognizes the other events.

We claim:

1. Wide-band intergrated services communication system, where there are transmitted both packet-switched and circuit-switched communications comprising:
   plurality of units;
   plurality of stations coupled to said units;
   transmission line coupled to said units through which information emitted by one of said stations is rendered available to others of said stations, whereby in presence of both packet-switched and circuit-switched communications, said information of all said stations is organized into hybrid frames subdivided into two regions allotted to circuit-switched communications, hereafter referred to as a circuit region, or to packet-switched and to signalling of circuit-switched communications, hereafter referred to as packet region;
   whereby said units comprising:
   means for controlling access to said transmission line for said information transmission and reception on basis of existing activity whereby said means controlling access to said transmission line are coupled to said transmission line as to detect at least activity of said units placed more upstream with reference to direction of transmission of said transmission line and cooperate with each of said units;
   means for frame synchronization; whereby:
   in each of said two frame regions, activity of said units with said information to be transmitted is subdivided into rounds, during which each of said units is ensured access to said transmission line for transmission of said information of each of said units, each of said rounds for information transmission concerning said circuit-switched communications coinciding with said circuit region of one of said frames, while said rounds for information transmission concerning said packet-switched communications can be completely contained within said packet region of one of said frames or said packet-switched communications can be contained over plurality consecutive of said frames;
   in said circuit region and said packet region said units access said transmission line for transmission of information generated by said stations in order corresponding to position of said units along said transmission line, beginning from one of said units which is most upstream, referring to transmission direction on said transmission line;
   in said circuit region, active period of one of said units has a duration varying from frame to frame according to instantaneous requirements of communications to which said information transmitted by said stations coupled to said units refers; and
   said stations send said information according to predetermined order, which is maintained for said activity, said active period being separated by inactivity periods which depend on position of said units with respect to said transmission line, a guard signal effective during a predetermined guard time, and said inactivity periods are shorter than said predetermined guard time said guard time being exceeded in case of lack of activity of one of said unit.

2. A system as defined in claim 1 whereby in each of said units said means for controlling access to said transmission line comprise a pair of logic networks which recognize the access right of said units to which said units belong, during said circuit region or said packet region, respectively, by counting said inactivity periods and the number of times by which said guard-time is reached.

3. A system as defined in claim 1, whereby each of said unit comprises means to encode said information to be transmitted according to a self-synchronizing code and for transmitting bit patterns forming a violation of said code to separate said information relevant to different stations and to indicate end of activity and lack of activity of one of said stations.

4. A system as defined in claim 3 whereby each of said units performs a regeneration of signals coming from upstream prior to transmission of said information, said means to encode transmit further bit patterns to indicate the end of activity of a unit and to implement said inactivity periods and/or guard times.

5. A system as defined in claim 1 whereby said information relevant to circuit-switched communications generated by different stations of one of said units are organized during said circuit-switched activity, of one of said units during one of said frames so that there is an alternation of said information relevant to first type of communications, whereby source is characterized by emissions and pauses, and said information relevant to a second type of communications, whose source presents a continuous emission during the whole communications, and in that said means controlling access in each of said units further comprise a logic network counting number of communications of said first type originated by stations associated with said preceding units and with said unit itself and active during said frame, and enable transmission of said information relevant to further communications of same type, only if said number is lower than predetermined maximum.

6. A system as defined in claim 1 whereby said means for frame synchronization is unique for all of said units.

7. A system as defined in claim 1 whereby each of said units is associated with a generator of frame signals.

8. A system as defined in claim 7 whereby said frame signal generator is coupled between transmission branch and receiving branch of said transmission line and comprises a first means for generating Start-of-Frame flag, apt to send said flag on said transmission branch with constant periodicity; a second means for generating signals separating said two regions of frame and a third means for generating signals indicating the beginning of packet rounds, said second and third means for generating being enabled by frame and round recognizer, associated with said reception branch, when said recognizer recognizes the beginning of said frame and of said packet region, respectively, event to be signalled being recgnized by counting said units which had the access right in circuit and in said packet region of the frame, respectively.

9. A system as defined in claim 1 further comprises a pair of unidirectional lines on which the transmission takes place in opposite directions and along which said units are arranged, said units being connected to both lines by signal regenerators, and in that said frame signal generator comprises two identical elements each associated with one of said lines and inserted without regeneration between two ends of the respective line.

10. A system as defined in claim 9 whereby each of said units comprises separate devices for controlling the access to each of said lines.

11. A system as defined in claim 8 further comprising at least one main line along which a plurality of said units is arranged some of said units being connected to one of said units connected to one or more secondary lines associated with each of said respective frame signal generators and apt to convey said hybrid frames whose length is equal to that of frame on said main line, said units of said main line connected to said units associated to secondary lines inserting on said main line, in correspondence with their access turn, said circuit or said packet information relevant to said hybrid frames transmitted on said secondary lines.

* * * * *